(12) United States Patent
Arai (10) Patent No.: US 8,510,632 B2
(45) Date of Patent: Aug. 13, 2013

(54) CONTROL METHOD FOR A SEMICONDUCTOR MEMORY DEVICE

(71) Applicant: Elpida Memory, Inc., Tokyo (JP)

(72) Inventor: Tetsuya Arai, Tokyo (JP)

(73) Assignee: Elpida Memory Inc., Tokyo (JP)

( * ) Notice: Subject to any disclaimer, the term of this patent is extended or adjusted under 35 U.S.C. 154(b) by 0 days.

(21) Appl. No.: 13/740,724

(22) Filed: Jan. 14, 2013

(65) Prior Publication Data

US 2013/0132797 A1    May 23, 2013

Related U.S. Application Data

(63) Continuation of application No. 12/620,285, filed on Nov. 17, 2009, now Pat. No. 8,381,070.

(30) Foreign Application Priority Data

Nov. 17, 2008 (JP) ................ 2008-293271

(51) Int. Cl.
*G11C 29/00* (2006.01)

(52) U.S. Cl.
USPC ............. 714/764; 714/763; 714/766

(58) Field of Classification Search
USPC ................. 714/763, 764, 766
See application file for complete search history.

(56) References Cited

U.S. PATENT DOCUMENTS

| 6,182,253 | B1 | 1/2001 | Lawrence et al. |
| 6,697,992 | B2 | 2/2004 | Ito et al. |
| 6,725,343 | B2* | 4/2004 | Barroso et al. ............ 711/145 |
| 7,603,592 | B2 | 10/2009 | Sekiguchi et al. |
| 7,783,957 | B2* | 8/2010 | Carnevale et al. ......... 714/766 |
| 7,805,658 | B2 | 9/2010 | Luk et al. |
| 7,836,380 | B2 | 11/2010 | Bains |
| 8,161,356 | B2 | 4/2012 | Bains et al. |
| 2004/0243885 | A1 | 12/2004 | James et al. |
| 2008/0115039 | A1* | 5/2008 | Bains ........................ 714/763 |
| 2010/0110803 | A1 | 5/2010 | Arai |

FOREIGN PATENT DOCUMENTS

JP    2007-042176    2/2007

* cited by examiner

*Primary Examiner* — Charles Ehne
(74) *Attorney, Agent, or Firm* — Young & Thompson (57) ABSTRACT

To provide a memory array for information bit that stores information bits, a memory array for check bit that stores check bits, a correction circuit that, in response to a write request, reads the information bit and the check bit corresponding to a write address from the respective memory arrays and corrects an error included in the information bit, and a mixer temporarily holding information bit corrected by the correction circuit. The mixer overwrites only a part of bytes of the held information bits with write data according to a byte mask signal. Accordingly, a capacity required for the memory array for check bit can be reduced while the byte mask function is maintained.

14 Claims, 7 Drawing Sheets

CONTROL METHOD FOR A SEMICONDUCTOR MEMORY DEVICE

BACKGROUND OF THE INVENTION

1. Field of the Invention

The present invention relates to a semiconductor memory device and a control method thereof, and more particularly relates to a semiconductor memory device having an ECC (Error Correction Code) circuit incorporated therein and a control method of the semiconductor memory device.

2. Description of Related Art

In a semiconductor memory device having an ECC circuit incorporated therein, such as an ECC-circuit built-in DRAM, there is a necessity to store an "information bit" actually required and a "check bit" used for correcting the information bit when an error occurs in the information bit. Thus, during a write operation, the information bit is written and coded to generate the check bit (a coding step). During a read operation, the information bit and the check bit are read, the read information bit is coded (a coding step), and the coded information bit is compared to the check bit. In this way, a defective part in the information bit is found (a check step), the defective part in the information bit is corrected, and then the resultant bit is outputted (correction). As described above, "coding" is performed in the write operation and "coding"→"check"→"correction" is performed in the read operation.

The number of check bits required for correcting a certain bits of information bits is calculated by information theory. Even in the simplest single error correction, the number of check bits m capable of correcting k bits of information bits needs to satisfy the formula (15) mentioned below. When the number of bits to be corrected is increased, more check bits are required accordingly.

$$2^m \geq m+k+1 \quad (15)$$

From the formula (15), when k is 8, m becomes 4, when k is 16, m becomes 5, and when k is 32, m becomes 6. As the number of information bits is increased, the ratio of number of check bits m required to the number of information bits k is decreased. However, as the DRAM requires a "byte mask function" for masking a part of data to be read/written at the same time, the check bit has to be assigned per one byte, that is, 8 bits even if a large number of bits of data are read/written at the same time. In this case, for 8 bits of information bits, 4 bits of check bits are required. The total number of bits is thus 12 bits, which is 1.5 times larger than the information bit. This means that a memory cell array becomes 1.5 times larger, resulting in a significant increase in chip size.

To avoid this problem, during a read operation, read is performed as usual like "coding"→"check"→"correction". Meanwhile, during a write operation, read ("coding"→"check"→"correction") is performed first, the corrected data is mixed with write data, and write ("coding") is then performed using updated total information bit. Before write is actually performed upon the memory cell array, already written data is read temporarily, so that the number of information bits is increased.

The method described in Japanese Patent Application Laid-open (JP-A) No. 2007-42176 is known to be one of methods utilizing the above principle. The method described in JP-A No. 2007-42176 utilizes a sense-amplifier activating operation and a pre-charge operation in a DRAM. "Coding"→"check"→"correction" (corresponding to the read operation described above) is performed first by an ACT command and the corrected data is held at a sense amplifier. When a READ command is inputted, the corrected data held by the sense amplifier is read. When a write command is inputted, write data is overwritten on the corrected data held by the sense amplifier. "Coding" (corresponding to the write operation described above) is finally performed by a pre-charge command.

That is, in the read command, the data corrected and read by the ACT command is read. In the write command, the data read by the ACT command is mixed with the write data and the resultant data is coded finally by the pre-charge command, so that the write operation is performed. According to JP-A No. 2007-42176, already written data is read temporarily using the row cycle, thereby increasing the number of information bits. The ECC operation is thus performed without any limitation on the number of information bits.

SUMMARY

However, because the method of JP-A No. 2007-42176 performs a calculation using the row cycle, the calculation is performed upon all active sense amplifiers. That is, because the calculation needs to be performed also upon data that is not actually inputted/outputted, more consumption power is required. As the calculation is performed upon the sense amplifier, a sense amplifier for information bit and a sense amplifier for check bit need to be always in the same combination. The column select line needs to be also in the same combination. Needless to mention, a redundant column select line for redundancy repair needs to be in the same combination. When the number of information bits is designed to be relatively large, the number of redundant column select lines required for repairing a failed bit is increased and the design of repair becomes difficult.

The present invention seeks to solve one or more of the above problems, or to improve upon those problems at least in part.

In one embodiment, there is provided a semiconductor memory device comprising: a memory array that stores information bits and check bits; a correction circuit that reads the information bits and the check bits corresponding to a write address including a row address and a column address from the memory array in response to a write request and corrects an error included in the information bits; and a mixer that temporarily holds information bits corrected by the correction circuit, wherein the mixer can overwrite only a part of bytes of the information bits held by the mixer with write data according to a byte mask signal.

In another embodiment, there is also provided a control method of a semiconductor memory device including a memory array that stores information bits and check bits, the control method comprising: reading information bits and check bits corresponding to a write address including a row address and a column address from the memory array in response to an issuance of a write request; correcting an error included in read information bits using read check bits; overwriting corrected information bits with a write data; and writing overwritten information bits in the memory array.

According to the present invention, an ECC operation that is not restricted by the number of information bits can be performed utilizing a column cycle instead of a row cycle. Accordingly, problems of Japanese Patent Application Laid-open No. 2007-42176 can be solved. That is, only minimum computation required for the ECC operation is performed upon actually inputted/outputted data, and thus there will be no wasteful operations. In addition, because the computation is performed outside an array, a circuit for redundancy repair is not restricted at all.

Further, a plurality of bytes of information bits are read to be held in a mixer during a write operation and can be overwritten partially or entirely by write data according to a byte mask signal. Therefore, the number of information bits to be processed at a time can be increased regardless of presence of byte masks. Accordingly, a capacity required for the memory array for check bit can be reduced.

BRIEF DESCRIPTION OF THE DRAWINGS

The above features and advantages of the present invention will be more apparent from the following description of certain preferred embodiments taken in conjunction with the accompanying drawings, in which:

FIG. 3 is a circuit diagram of a detection circuit 130a;

DETAILED DESCRIPTION OF THE EMBODIMENTS

Write and read are described first with respect to a single error correcting Hamming code that is a systematic code usually used for memories among a normal ECC operation. Assume that the number of information bits is k bit, the number of check bits is m bit, and total data is n(=k+m) bit. A calculation is performed, modulo 2. An element is {0, 1}, and addition+ is exclusive-OR. The systematic code means a code that an information bit and a check bit can be separated perfectly from each other.

Write is described first. An information bit i with a k bit width to be written is represented by formula (1).

$$i = \begin{bmatrix} i_1 \\ i_2 \\ \vdots \\ i_k \end{bmatrix} \quad (1)$$

Because the information bit i and a check bit p can be processed in a separated manner in the systematic code, the information bit i is written as it is in a memory array for information bit and the check bit p with an m bit width obtained by being transformed using an m×k (row m×column k) transformation matrix A is written in a memory array for check bit. These processes are represented by formulas (2) to (4).

$$\begin{cases} p = \begin{bmatrix} p_1 \\ p_2 \\ \vdots \\ p_m \end{bmatrix} = A \cdot i & (2) \\ A = \begin{bmatrix} A_{11} & A_{12} & \dots & A_{1k} \\ A_{21} & A_{22} & \dots & A_{2k} \\ \vdots & \vdots & \dots & \vdots \\ A_{m1} & A_{m2} & \dots & A_{mk} \end{bmatrix} = [\, a_1 \;\; a_2 \;\; \dots \;\; a_k \,] & (3) \\ a_i = \begin{bmatrix} A_{1i} \\ A_{2i} \\ \vdots \\ A_{mi} \end{bmatrix} \quad \text{where } i = 1, 2, \dots, k & (4) \end{cases}$$

Column vectors $a_i$ (i=1, 2, ..., k) serving as elements of the transformation matrix A are not zero vectors and unit vectors, either. The column vectors are different from each other. Write is performed as described above and "coding" corresponds to the part that the transformation matrix A is caused to act on the information bit i to transform into the check bit p. As a result, the total data D with an n(=k+m) bit width represented by formula (5) is written in the memory array.

$$d = \begin{bmatrix} i_1 \\ i_2 \\ \vdots \\ i_k \\ p_1 \\ p_2 \\ \vdots \\ p_m \end{bmatrix} = \begin{bmatrix} i \\ p \end{bmatrix} \quad (5)$$

Read is described next. Assume that an error e with an n bit width is superimposed on the total data d written in the memory array, so that the total data d is changed into d'. Similarly, assume that the information bit is changed into i' and the check bit is changed into p'. These processes are represented by formulas (6) and (7).

$$\begin{cases} d' = \begin{bmatrix} i' \\ p' \end{bmatrix} = \begin{bmatrix} i + e1 \\ p + e2 \end{bmatrix} = d + e & (6) \\ e = \begin{bmatrix} e1_1 \\ e1_2 \\ \vdots \\ e1_k \\ e2_1 \\ e2_2 \\ \vdots \\ e2_m \end{bmatrix} = \begin{bmatrix} e1 \\ e2 \end{bmatrix} & (7) \end{cases}$$

First, the transformation matrix A that is the same as the matrix used for writing the information bit i' is caused to act to compare to the coded and written check bit p', so that a comparison bit q with an m bit width is obtained. That is, the comparison bit q is represented by formula (8) from formula (6).

$$q = A \cdot i' = A \cdot i + A \cdot e1 \quad (8)$$

When there are no errors, the comparison bit q should match with the check bit p', which can be found surely by formula (8). "Coding" corresponds to the process that the transformation matrix A is caused to act on the information bit i' to obtain the comparison bit q. The systematic code is characterized by that the same transformation matrix A as the matrix used for read can be used.

Next, to determine whether the comparison bit q matches with the check bit p', assume that addition (modulo 2) is performed and a result bit s with an m bit width is obtained. The result bit s is represented by formulas (9) to (11) from formulas (2), (6), and (8). This calculation utilizes the law of addition a+a=0, modulo 2.

$$\begin{cases} s = q + p' & (9) \\ \quad = \{A \cdot i + A \cdot e1\} + \{p + e2\} \\ \quad = \{A \cdot i + A \cdot e1\} + \{A \cdot i + e2\} \\ \quad = A \cdot e1 + e2 \\ \quad = [A \quad Um] \cdot \begin{bmatrix} e1 \\ e2 \end{bmatrix} = \\ \quad H \cdot e \text{ where } Um \text{ represents } m \times m \text{ unit matrix} \\ H = [a_1 \ \ldots \ a_k \ um_1 \ \ldots \ um_m] & (10) \\ um_i = \begin{bmatrix} 0 \\ \vdots \\ 0 \\ 1 \\ 0 \\ \vdots \\ 0 \end{bmatrix} \begin{matrix} \leftarrow \text{row}(1) \\ \vdots \\ \leftarrow \text{row}(i-1) \\ \leftarrow \text{row}(i) \\ \leftarrow \text{row}(i+1) \\ \vdots \\ \leftarrow \text{row}(m) \end{matrix}, \text{ where } i = 1, 2, \ldots, m & (11) \end{cases}$$

Assume that the error e is a single error. When an error exists at the ith bit of e, the result bit s is represented by formula (12) from formulas (9) and (10).

$$s = H \cdot e \qquad (12)$$

$$= [a_1 \ \ldots \ a_k \ um_1 \ \ldots \ um_m] \cdot \begin{bmatrix} 0 \\ \vdots \\ 0 \\ 1 \\ 0 \\ \vdots \\ 0 \end{bmatrix} \begin{matrix} \leftarrow \text{row}(1) \\ \vdots \\ \leftarrow \text{row}(i-1) \\ \leftarrow \text{row}(i) \\ \leftarrow \text{row}(i+1) \\ \vdots \\ \leftarrow \text{row}(n) \end{matrix}$$

$$= \begin{cases} a_i & \text{case of } i \in [l, k] \\ um_{i-k} & \text{case of } i \in [k+1, n(=k+m)] \end{cases}$$

That is, when the error exists at the information bit i' (i∈[1,k]), $a_i$ which is the ith column vector element of the transformation matrix A is obtained. When the error exists at the check bit p' (i∈[k+1,n]), umi-k which is the (i-k)th column unit vector element of the unit matrix um is obtained. $a_i$ is neither the zero vector nor the unit vector and is different from each other as described above. It is thus determined that the error occurs in the ith bit from the result of the result bit s. $a_i$ is not the zero vector so as to be distinguished from the case the error does not exist. $a_i$ is not the unit vector so as to be distinguished from the case the error exists at the check bit p' (i∈[k+1,n]). Because the result bit s provides error bit information, it is called a syndrome. Because a matrix H in formula (10) is used for calculating the syndrome as in formula (12), it is called a Hamming check matrix. A vector function F is then caused to act on a syndrome s with an m bit width, that is, the syndrome s is decoded, so that error bit position data t with a k bit width that is error bit information of the information bit i' is calculated. Error correction is performed only upon the information bit i' and the check bit p' is excluded. This is because the information bit i' is read correctly even if the error exists at the check bit p' in the single error correcting Hamming code. This is often used for reducing circuits, which is represented by formula (13).

$$t = F(s) = \begin{bmatrix} f_1(s) \\ f_2(s) \\ \vdots \\ f_k(s) \end{bmatrix} \xrightarrow{\text{when error exists at ith bit}} \begin{bmatrix} 0 \\ \vdots \\ 0 \\ 1 \\ 0 \\ \vdots \\ 0 \end{bmatrix} \begin{matrix} \leftarrow \text{row}(1) \\ \vdots \\ \leftarrow \text{row}(i-1) \\ \leftarrow \text{row}(i) \\ \leftarrow \text{row}(i+1) \\ \vdots \\ \leftarrow \text{row}(k) \end{matrix} = e1 \qquad (13)$$

A function fi (i=1, 2, ..., k) that is the element of the vector function F is selected so as to be 1 only when the syndrome s is equal to the ith column vector element $a_i$ of the transformation matrix A. Only the element indicating a bit of the information bit i' to be corrected in the elements of the error bit position data t is 1 and other elements are 0. The error bit position data t is thus equal to the error e1. The process of comparing the comparison bit q to the check bit p' to obtain the error bit position data t from the syndrome corresponds to "check".

The error bit position data t is then caused to act on the information bit i' for correction, which is represented by formula (14).

$$i'+t=\{i+e1\}+e1=i \qquad (14)$$

Formulas (6) and (13) and the law of addition a+a=0 modulo 2 are used. The process that the position data t obtained from the syndrome is caused to act on the information bit i' to correct the information bit corresponds to "correction".

As described above, "coding"→"check"→"correction" is performed in read.

As described above, as data stored in the ECC circuit built-in DRAM, the "information bit" actually required and the "check bit" used for correcting the information bit when errors occur in the information bit are provided. During the write operation, the information bit is written and coded to generate the check bit (coding step) and the resultant check bit is written. During the read operation, the information bit and the check bit are read, the read information bit is coded (coding step), and the coded information bit is compared to the check bit. As a result, a failed bit in the information bit is found (check step), the failed bit in the information bit is corrected, and the resultant bit is read (correction). As described above, "coding" is performed in write and "coding"→"check"→"correction" is performed in read.

The number of check bits required for correcting a certain bits of the information bit is calculated by the information theory. Even in the simplest single error correction, the number of check bits m capable of correcting k bits of the information bit needs to satisfy the above described formula (15). That is, when the number of outcomes $2^m$ that can be represented by m check bits is larger than the sum of the number of failed bits (m+k) when such failed bits exist and 1 that is the number of outcomes when the failed bits do not exist, the failed bits can be determined by the check bit.

From formula (15), when k=8, m=4, when k=16, m=5, and when k=32, m=6. As the number of information bits is increased, the ratio of number of check bits m required to the number of information bits k is decreased. As a DRAM requires a "byte mask function" for masking a part of data to be read/written at the same time, the check bit needs to be assigned per one byte, that is, 8 bits even if a large number of bits of data are read/written at the same time. In this case, for 8 bits of information bit, 4 bits of the check bit are required. The total number of bits is thus 12 bits, which is 1.5 times larger than the information bit. This means that the memory cell array becomes larger 1.5 times, resulting in a significant increase in a chip size.

The present embodiment solves the problem described above and the problems in JP-A No. 2007-42176. According to the present embodiment, a circuit configuration that can perform the ECC operation without any limitations on the number of information bits by using not the row cycle but a column cycle is provided. Thus, the problems in JP-A No. 2007-42176 can be solved. That is, because only the minimum necessary calculation is performed for the ECC operation of actually inputted/outputted data, there will be no wasteful calculation. Further, the calculation is performed outside the array. There is thus no limitation at all on circuits for redundancy repair.

In the read cycle, only the read operation is performed. In the write cycle, the read operation needs to be performed first and then the write operation needs to be performed. Specific descriptions thereof are made below. This operation is possible when the write operation/read operation is performed upon the entire array and the read operation is performed so that coding is integrated into check such as "coding and check"→"correction" so as to be different from a coder for the write operation even if an ECC code is not a systematic code. In the case of the systematic code, however, a coder for the write operation can be the same as the one for the read operation, which leads to easier timing design. Accordingly, a case of the systematic code is exemplified in the following descriptions.

Figure 1:
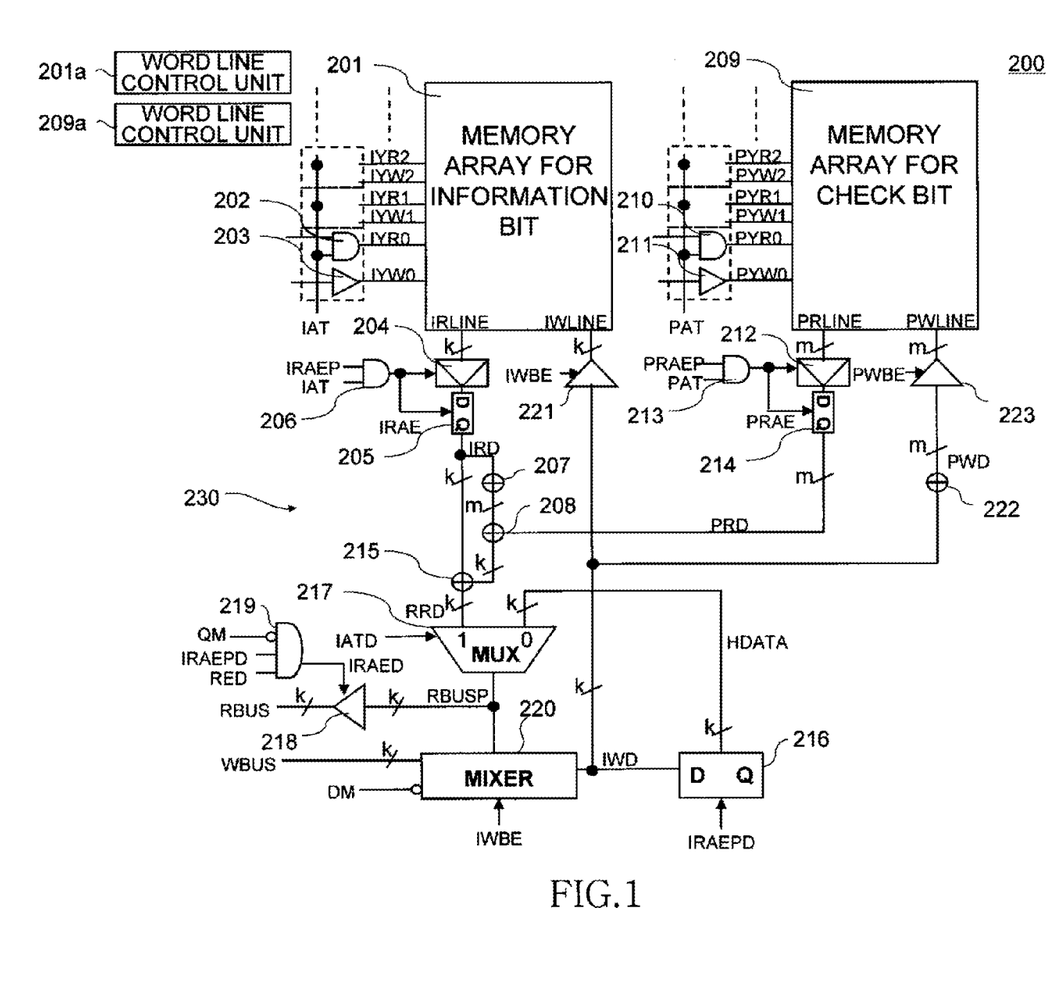
FIG. 1 is a circuit diagram showing a configuration of principal parts of a semiconductor memory device 200 according to a first embodiment of the present invention.

FIG. 1 is a circuit diagram showing a configuration of principal parts of a semiconductor memory device 200 according to the first embodiment. Although not particularly limited thereto, the semiconductor memory device 200 according to the first embodiment is a DRAM.

As shown in FIG. 1, the semiconductor memory device 200 according to the first embodiment includes a memory array 201 for information bit and a memory array 209 for check bit. The memory array 201 for information bit stores information bits and the memory array 209 for check bit stores check bits.

Figure 2:
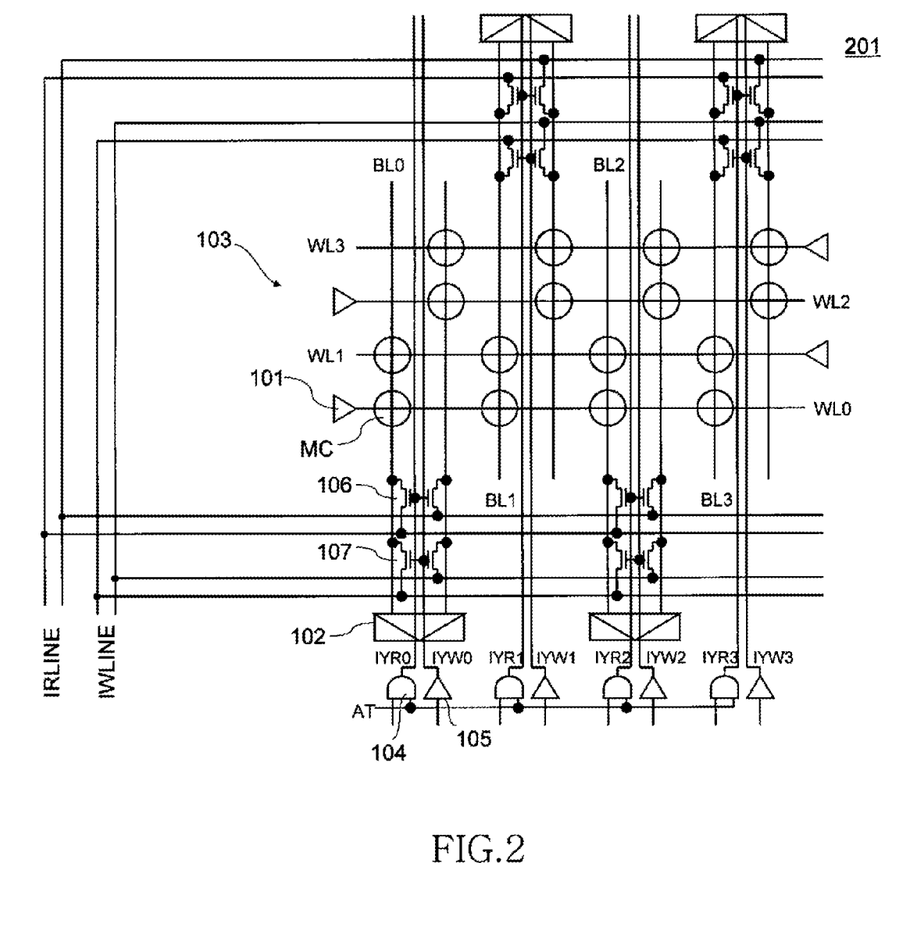
FIG. 2 is a circuit diagram showing a configuration of the memory array 201 for information bit.

FIG. 2 is a circuit diagram showing a configuration of the memory array 201 for information bit.

As shown in FIG. 2, the memory array 201 for information bit includes a memory cell array 103 that includes word lines WL0, WL1, . . . , bit line pairs BL0, BL1, . . . , and memory cells MC arranged at intersections of the word lines with the bit lines. The word lines WL0, WL1, . . . are driven by corresponding word drivers 101. A sense amplifier 102 is connected to each of the bit line pairs BL0, BL1, . . . . Each sense amplifier 102 is connected via a corresponding column switch 106 to a data line IRLINE for read and via a corresponding column switch 107 to a data line IWLINE for write. Column select signals IYR0, IYR1, . . . for read serving as outputs of column select drivers 104 for read are supplied to the respective column switches 106 and any one of the switches is turned on during the read operation. Column select signals IYW0, IYW1, . . . for write serving as outputs of column select drivers 105 for write are supplied to the respective column switches 107 and any one of the switches is turned on during the write operation.

The data line IRLINE for read is a wiring for transmitting complementary read data and connected to an input/output circuit 230 shown in FIG. 1. The data line IWLINE for write is a wiring for transmitting complementary write data and connected to the input/output circuit 230 shown in FIG. 1. The circuit shown in FIG. 2 corresponds to one bit of I/O in the memory array 201 for information bit. Because the memory array 201 for information bit inputs/outputs k bits of information bits as shown in FIG. 1 in the present embodiment, k circuits shown in FIG. 2 are thus provided.

The memory array 209 for check bit has the same circuit configuration as that of the memory array 201 for information bit shown in FIG. 2. Because the memory array 209 for information bit inputs/outputs m bits of check bits as shown in FIG. 1 in the present embodiment, m circuits shown in FIG. 2 are thus provided. In the memory array 209 for check bit, a data line PRLINE for read is used instead of the data line IRLINE for read, and a data line PWLINE for write is used instead of the data line IWLINE for write. Further, column select signals PYR0, PYR1, . . . for read are used instead of the column select signals IYR0, IYR1, . . . for read and column select signals PYW0, PYW1, . . . for write are used instead of the column select signals IYW0, IYW1, . . . .

Read data (information bit) to be read from the memory array 201 for information bit is supplied to a data line IRLINE for read based on column select signals IYR0, IYR1, . . . for read serving as outputs of a column select driver 202 for read. Write data (information bit) to be written in the memory array 201 for information bit is supplied from a data line IWLINE for write based on column select signals IYW0, IYW1, . . . for write serving as outputs of a column select driver 203 for write. Similarly, read data (check bit) to be read from the memory array 209 for check bit is supplied to a data line PRLINE for read based on column select signals PYR0, PYR1, . . . for read serving as outputs of a column select driver 210 for read. Write data to be written in the memory array 209 (for check bit) is supplied from a data line PWLINE for write based on column select signals PYW0, PYW1, . . . for write serving as outputs of a column select driver 211 for write.

The bit width of the data line IRLINE for read and the data line IWLINE for write provided for the memory array 201 for information bit is k bits. The bit width of the data line PRLINE for read and the data line PWLINE for write provided for the memory array 209 for check bit is m bits. These data lines IRLINE, IWLINE, PRLINE, and PWLINE are connected to an input/output circuit 230.

The input/output circuit 230 includes a coding circuit 207, a check circuit 208, and a correction circuit 215 provided between the data line IRLINE for read and a multiplexer 217. The coding circuit 207 generates m bits of check bit from k bits of read data IRD read from the memory array 201 for information bit. The check circuit 208 checks the check bit generated by the coding circuit 207 with the check bit read through the data line PRLINE for read from the memory array 209 for check bit. The correction circuit 215 corrects the information bit based on the check result of the check circuit 208 so that the information bit including errors becomes the correct one. The information bit corrected by the correction circuit 215 is supplied via the multiplexer 217 to the read bus RBUS and to a mixer 220.

The mixer 220 temporarily stores the information bit read from the memory array 201 for information bit and corrected and overwrites the information bit by write data inputted through the write bus WBUS. Overwrite of the information bit by the write data can be performed on a byte basis by a byte mask signal DM for write. Even if the information bit has plural bytes, partial overwrite can be performed on a one byte basis.

An output of the mixer 220 is supplied via a write buffer 221 to the data line IWLINE for write. The output of the mixer 220 is also supplied to a coding circuit 222, so that m bits of the check bit are generated from k bits of the information bit. The generated check bit (write data PWD) is supplied via a write buffer 223 to the data line PWLINE for write. The output of the mixer 220 is also supplied to a register 216. An output of the register 216 is supplied to the multiplexer 217.

Figure 3:
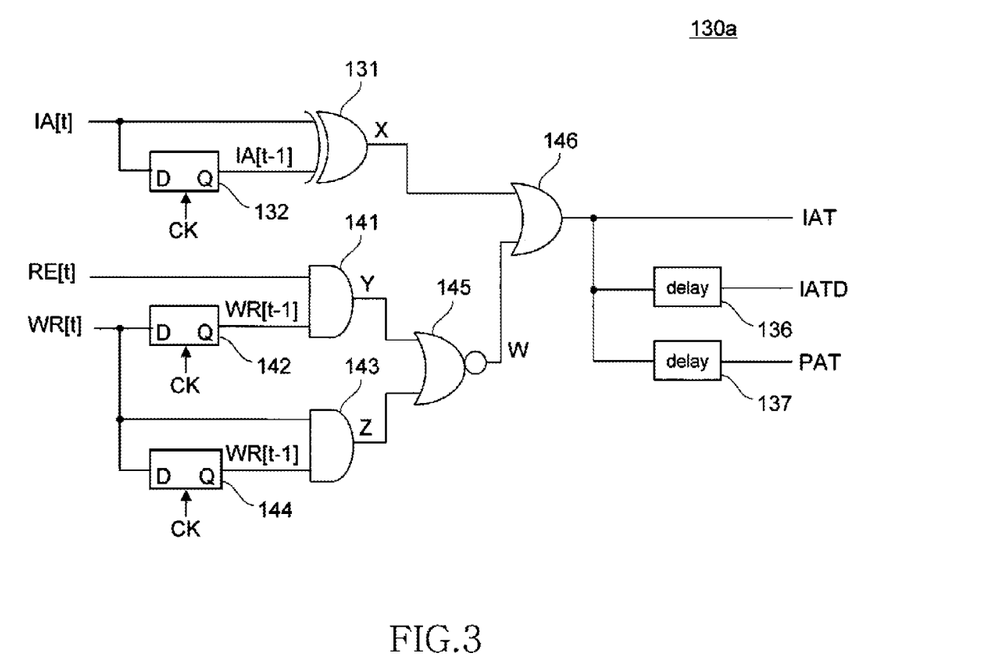

FIG. 3 is a circuit diagram of a detection circuit 130a for generating address transition detection signals IAT, IATD, and PAT.

As shown in FIG. 3, a current selected address IA[t], a current read-state flag RE[t], and a current write-state flag WR[t] are supplied to the detection circuit 130a. The "state flag" means a signal that becomes "H" when a corresponding cycle is in a corresponding state and becomes "L" in otherwise cases.

The current selected address IA[t] is supplied to an EXOR gate 131 without any processing and also to a DQ latch 132. The DQ latch 132a is a circuit latching and then outputting the current selected address IA[t] in synchronization with an internal clock corresponding to an internal clock one cycle after the current cycle. The output is thus IA[t−1] indicating the selected address one cycle before the current cycle. A DQ flip-flop is used conveniently for the DQ latch. IA[t−1] indicating the selected address one cycle before the current cycle is supplied to the EXOR gate 131. Accordingly, when the same selected address is inputted twice consecutively, the EXOR gate 131 sets an output X to L. In other cases, the output X is maintained at a high level.

The detection circuit 130a further includes an AND gate 141 to which the current read-state flag RE[t] and a write-state flag WR[t−1] one cycle before the current cycle generated by a DQ latch 142 are supplied. When the write operation and the read operation are requested consecutively (write-to-read operation), the AND gate 141 sets an output Y to H. In other cases, the output Y is maintained at an L level.

The detection circuit 130a further includes an AND gate 143 to which the current write-state flag WR[t] and the write-state flag WR[t−1] one cycle before the current cycle generated by a DQ latch 144 are supplied. Thus, when the write operation is requested twice consecutively (write-to-write operation), the AND gate 143 sets an output Z to H. In other cases, the output Z is maintained at the L level.

The outputs Y and Z are supplied to a NOR gate 145 and an output W of the NOR gate 145 and an output X of the EXOR gate 131 are supplied to an OR gate 146. Thus, when the same selected address is inputted during the write-to-read operation and when the same selected address is inputted during the write-to-write operation, the logical level of the address transition detection signal IAT becomes L.

The address transition detection signal IAT is supplied to delay circuits 136 and 137. An output of the delay circuit 136 is the delay address transition detection signal IATD and an output of the delay circuit 137 is the delay address transition detection signal PAT. The delay address transition detection signals IATD and PAT are obtained by delaying the address transition detection signal IAT to adjust timing.

In this way, the address transition detection signals IAT, IATD, and PAT are generated. The address transition detection signal IAT is used for controlling the information bit. The delay address transition detection signal IATD is obtained by delaying the address transition detection signal IAT in a timed manner with an activation signal IRAEPD for determining a timing of outputting corrected data to the read bus RBUS. The address transition detection signal PAT is used for controlling the check bit. While IAT, IATD, and PAT="H" in ordinary case, IAT, IATD, and PAT="L" when the address of a read cycle is the same as that of a write cycle in the write-to-read operation or when the addresses of the write cycles are the same in the write-to-write operation.

There is described below a normal operation, that is, an operation when the address transition detection signals IAT, IATD, and PAT are "H".

A read cycle is described first. In the read cycle, only the read operation is performed. For the memory array 201 for information bit, the column select line IYR for read is driven by the column select driver 202 and k bits of information bit data are read to the data line IRLINE for read. The read information bit is amplified by a read amplifier 204 in synchronization with an activation signal IRAEP and held by a hold circuit 205. Further, k bits of the information bit data are converted into m bits of code bit data by the coding circuit 207.

On the other hand, for the memory array 209 for check bit, the column select line PYR for read is driven by the column select driver 210 and m bits of check bit data are read to the data line PRLINE for read. The read check bit is amplified by a read amplifier 212 in synchronization with an activation signal PRAEP and held by a hold circuit 214. Timings of driving the column select line PYR for check bit and of activating the read amplifier 212 are delayed with respect to the column select line and the read amplifier for the information bit by the time required for the coding circuit 207 to code. Thus, the check bit generated by the coding circuit 207 and the check bit read from the memory array 209 for check bit reach the check circuit 208 substantially at the same time.

The check circuit 208 performs a calculation using these two check bits so as to provide k error bit position data, that is, a syndrome. The resultant syndrome is supplied to the correction circuit 215. The correction circuit 215 performs a calculation using the information bit data held by the hold circuit 205 and the syndrome supplied from the check circuit, corrects errors included in the information bit data, and outputs corrected data RRD. At this time, while some data appears in the signal line HDATA in synchronization with the activation signal IRAEPD, the multiplexer 217 selects an input 1 because the delay address transition detection signal IATD="H". The multiplexer 217 thus outputs the corrected data RRD to the signal line RBUSP.

When the delay address transition detection signal IATD changes, it is designed so as to change at the same timing as the activation signal IRAEPD. An AND gate 219 is a circuit that determines whether data on the signal line RBUSP is outputted to the read bus RBUS and generates a signal IRAED by the activation signal IRAEPD and a signal RED. Read on a 1 byte basis can be also performed by a byte mask signal QM for read. The signal RED is obtained by delaying a read-state flag according to the activation signal IRAEPD. In this case, RED="H" and bytes of data required for the read bus RBUS are outputted according to the read mask information QM by causing the data in the signal line RBUSP to be in synchronization with the activation signal IRAEPD. The timing of activating the activation signal IRAEPD needs to be delayed with respect to the timing of activating the read amplifier 204 for information bit by the sum of the coding time in the coding circuit 207, the check time in the check circuit 208, and the correction time in the correction circuit 215. In this way, the corrected information bit data is outputted to the read bus RBUS.

A write cycle is described next. In the write cycle, the read operation is performed first and the write operation is then performed. Details of the read operation are the same as those described above and the corrected information bit data is outputted via the multiplexer 217 to the signal line RBUSP. As RED="L" in the write cycle, the output of the AND gate 219 is at the L level and a tri-state buffer 218 is inactivated. Read data is not outputted to the read bus RBUS.

In the subsequent write operation, write data supplied from the write bus WBUS is fetched into the mixer 220 in synchronization with a write buffer activation signal IWBE. The data corrected by the preceding read operation is supplied from the signal line RBUSP to the mixer 220. The mixer 220 mixes the write data with the read data according to data mask information DM to output k information bit data to the signal line IWD. The outputted information bit data is held by the register 216. To fetch the data from the signal line RBUSP into the mixer 220, the hold circuits 205 and 214 need to hold data before the fetch and desirably have a one cycle holding circuit configuration. The mixer 220 needs to pass the data to the register 216 when the read cycle is performed immediately after the write cycle. The mixer 220 thus has the one cycle holding circuit configuration.

Subsequently, k information bit data are written in the memory array 201 for information bit by the write buffer 221. The coding circuit 222 codes the k information bit data on the signal line IWD to generate m code bit data. The generated code bit data (check bits) are written in the memory array 209 for check bit by the write buffer 223 in synchronization with a write buffer activation signal PWBE. The timing of activating the write buffer 223 for check bit needs to be delayed with respect to the write buffer for information bit by the coding time in the coding circuit 222. Coding and write can be performed using the information bit with the number of bits more than the number of bits limited by the data mask.

The coding circuit 207 and the coding circuit 222 can have a circuit configuration with the same code theory. Thus, when the coding circuit 207 and the coding circuit 222 have exactly the same layout, their delay times match with each other. The design of timing thus becomes easy. That is, it is sufficient to delay the timing of controlling the memory array 209 for check bit evenly with respect the control timing of the memory array 201 for information bit by the coding time in the coding circuit 207 (=the coding time in the coding circuit 222). While write in the array for check bit is delayed by the time required in the coding circuit 222 in the write operation, the read operation can be also delayed by the time required in the coding circuit 207. When the times required in the respective coding circuits are the same, the write operation and the read operation can be performed alternately and smoothly.

More specifically, it is preferable that a word line control unit 209a of the memory array 209 for check bit and a word line control unit 201a of the memory array 201 for information bit are separate circuits and the ACT timing and the PRE timing are also delayed by the coding time in the coding circuit 207 (=the coding time in the coding circuit 222). The write time that goes on into the PRE operation by the coding time in the coding circuit 222 can be eliminated. When a read operation control system of the memory array 201 for information bit is caused to be in synchronization with an internal clock ICLK, it suffices that an internal clock ICLKD delayed with respect to the internal clock ICLK by the sum of the time required for the read amplifier 204 to amplify and the time required for "coding"→"check"→"correction" is used for data output and a write operation control system of the memory array 201 for information bit. For a read operation control system of the memory array 209 for check bit, it suffices that an internal clock PCLK delayed with respect to the internal clock ICLK by the "coding" time is used. For a write operation control system of the memory array 209 for check bit, it suffices that an internal clock PCLKD delayed with respect to the internal clock PCLK by the sum of the time required for the read amplifier 212 to amplify and the time required for "coding"→"check"→"correction" is used. It suffices that the word line control unit of the memory array 209 for check bit is delayed with respect to the memory array 201 for information bit by the coding time in the coding circuit 207 (=the coding time in the coding circuit 222). Thus, the operations of the respective circuits can be easily made to synchronize with each other.

Figure 4:
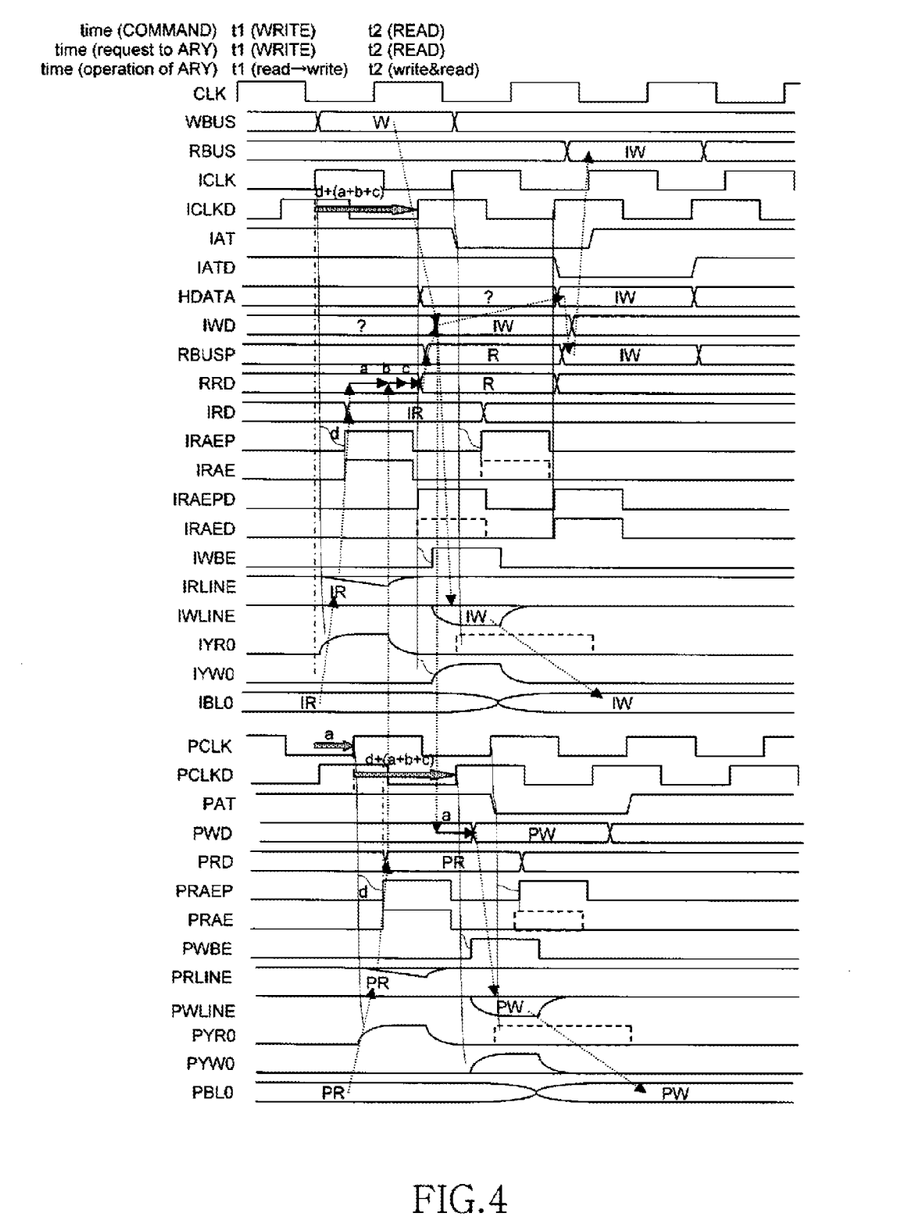
FIG. 4 is a timing diagram showing an operation timing when the address of the read cycle is the same as that of the write cycle in the write-to-read operation.

FIG. 4 is a timing diagram showing an operation timing when the address of the read cycle is the same as that of the write cycle in the write-to-read operation. FIG. 4 assumes the case of SDR (Single Data Rate). The same operation can be performed at DDR (Double Data Rate) when the same design is provided by considering the latency.

When a write command is inputted first at the time t1, the memory cell array receives a write cycle request at the time t1 and performs the write cycle, that is, the read operation and the write operation in this order. The read operation is started first. With respect to the information bit, the column select signal IYR0 is driven in synchronization with the internal clock ICLK and the information bit data IR is read from the bit line pair IBL0 to the data line IRLINE for read. The activation signal IRAEP waits from an active edge of the internal clock ICLK for an amplification wait time d to rise and is held by the hold circuit 205.

Meanwhile, with respect to the check bit, the column select signal PYR0 is driven in synchronization with the internal clock PCLK obtained by delaying the active edge of the internal clock ICLK by a coding time a and the check bit data PR is read from a bit line pair PBL0 to the data line PRLINE for read. The activation signal PRAEP waits from the internal clock PCLK for the amplification wait time d to rise and is held by the hold circuit 214.

The information bit data held by the hold circuit 205 is mixed with the check bit data held by the hold circuit 214 after the coding time a. The resultant mixed data is read as corrected data R after a check time b and a correction time c. Because the address transition detection signal IATD="H", the corrected data R is read to the signal line RBUSP and supplied to the mixer 220. While the output timing signal IRAEPD rises in synchronization with the internal clock ICLKD obtained by delaying the internal clock ICLK by d+(a+b+c), the signal IRAED does not rise because the current cycle is the write cycle. The corrected data R is not outputted to the read bus RBUS. While the data on the signal line IWD is held in the signal line HDATA by the signal IRAEPD, it is unnecessary data.

The write operation is started next. With respect to the information bit, the write buffer activation signal IWBE rises in synchronization with the internal clock ICLKD, write data W is fetched from the write bus WBUS, the previously read corrected data R is fetched from the signal line RBUSP, and the write data is mixed with the corrected data in the mixer 220. That is, the write data W is overwritten on the corrected data R. At this time, the overwrite operation is performed according to the data mask information DM. When the data mask is not instructed, the write data W is overwritten on all bits of the corrected data R. When the data mask is instructed, however, the write data W is overwritten on bit pairs of the corrected data R that are not masked. Mixed information bit IW for write is outputted to the signal line IWD and held by the register 216. The information bit IW for write on the signal line IWD is supplied via the write buffer 221 to the data line IWLINE for write and written in the bit line IBL0 in response to the activation of the column select signal IYW0. The information bit IW for write on the signal line IWD is also supplied to the coding circuit 222, so that a check bit PW is generated. The check bit PW is supplied via the write buffer 223 to the data line PWLINE for write and written in the bit line PBL0 in response to the activation of the column select signal PYW0. Because the check bit PW is delayed with respect to the information bit IW by the coding time a, it is written in the data line PWLINE for write by the write buffer activation signal PWBE in synchronization with the internal clock PCLKD obtained by delaying the internal clock PCLK by d+(a+b+c).

Subsequently, when a read command is inputted at the time t2, the memory cell array receives a read cycle request at the time t2 and thus the read operation is started. With respect to the information bit, while the column select signal IYR0 is tried to be caused to rise in synchronization with the internal clock ICLK, all column select signals IYR are maintained to be inactivated because the address transition detection signal IATD="L". While the information bit IW is being written currently because of the write operation in the previous cycle, this information bit is not read. While the read amplifier activation signal IRAE is tried to be caused to rise by the read amplifier that activates the timing signal IRAEP, the read amplifier 204 is not activated because the address transition detection signal IATD="L". Accordingly, the read amplifier 204 does not waste the current.

Meanwhile, with respect to the check bit, the column select signal PYR0 is tried to be caused to rise in synchronization with the internal clock PCLK, all column select signals PYR are maintained to be inactivated because the address transition detection signal PAT="L". That is, the check bit PW is currently being written because of the write operation in the previous cycle, but this check bit is not read. While the read amplifier activation signal PRAE is tried to be caused to rise by the read amplifier that activates the timing signal PRAEP, the read amplifier 212 is not activated because the address transition detection signal PAT="L". Accordingly, the read amplifier 212 does not waste the current.

As described above, the information bit and the check bit are not read from the respective memory arrays. The output timing signal IRAEPD then rises in synchronization with the internal clock ICLKD and the information bit held by the signal line IWD and used for write in the previous cycle is fetched into the register 216. The information bit used for write in the previous cycle thus appears in the signal line HDATA. The multiplexer 217 selects the input 0 and the information bit on the signal line HDATA is outputted to the read bus RBUS. Because the data on the signal line IWD is held by a static latch, errors hardly occur and thus any correction is not particularly required.

As described above, according to the first embodiment, no matter what accesses are requested in the ECC circuit built-in DRAM, the ECC operation can be realized without rate-controlling the cycle time. When the write operation is requested, even in the case that the data mask is provided, the information bit with the same number of bits as the one when the data mask is not provided is read and the write data is partially overwritten on this information bit. As a result, the number of information bits to be coded is increased. The ratio of number of check bits required to the number of information bits thus becomes decreased and the extension of the memory cell array can be suppressed. However, write in the memory cell array is delayed by the calculation time. Note that operations become difficult with respect to the spec tDPL(tWR) that determines the time when a pre-charge command can be inputted after a write command. An access time tAA is also delayed by the coding time.

A second embodiment of the present invention is described next.

The write operation upon the memory array 201 for information bit can be performed so as to perfectly overlap the subsequent read cycle in the first embodiment described above. In this case, the write operation upon the memory array 201 for information bit is in synchronization with clocks, but the memory array 201 for information bit needs to be accessed through a delay line corresponding to a computation time. Accordingly, the design of the delay line becomes complicated to a certain degree.

On the other hand, in the second embodiment, the access to the memory array 201 for information bit is made in pure synchronization with clocks. Two cycles are thus provided for an effective write cycle. The two cycles are constituted by a cycle of the memory array 201 for information bit itself for the read operation and a subsequent read cycle for the write operation. Therefore, one cycle is assigned to the computation for correction in the read operation and one cycle is assigned to the computation for coding in the write operation, so that design is made in synchronization with clocks and is facilitated. Note that the spec tDPL(tWR) requires one cycle latency. The circuit configuration shown in FIG. 1 can be used for a configuration of principal parts of a semiconductor memory device according to the second embodiment.

A read operation control system of the memory array 201 for information bit uses the internal clock ICLK. The data output uses the internal clock ICLKD, which is delayed with respect to the internal clock ICLK by the sum of the time required for the read amplifier 204 to amplify and the time required for "coding"→"check"→"correction", and the read operation control system of the memory array 209 for check bit uses the internal clock PCLK, which is delayed with respect to the internal clock ICLK by the "coding" time, which is the same as in the first embodiment. A write operation control system of the memory array 201 for information bit uses the internal clock ICLK and the write operation control system of the memory array 209 for check bit uses the internal clock PCLK. The detection circuit 130a shown in FIG. 3 can be used for signals that are basis of the address transition detection signals IAT, IATD, and PAT. In the case of a memory device with a write latency, when the series of operations described above is performed earlier according to the write latency, the problem about the latency of the spec tDPL (tWR) is solved. For example, in the case of DDR1, the series of operations can be performed one cycle earlier. In this case, signals that are basis of the address transition detection signals IAT, IATD, and PAT can use a detection circuit 130b shown in FIG. 5. "Earlier" in this context means that for the read operation and the write operation in response to an issuance of a write request, the read operation is performed during a write latency period and the write operation is performed after the write latency, that is, at a regular position. Accordingly, the write operation in response to an issuance of the write request and the read operation in response to an issuance of the read request are not performed at the same timing. That is, it appears that the read operation in response to the write request is hidden. Because the write operation in response to the write request is performed at a regular position, the problem about the latency of the spec tDPL(tWR) can be solved.

Figure 5:
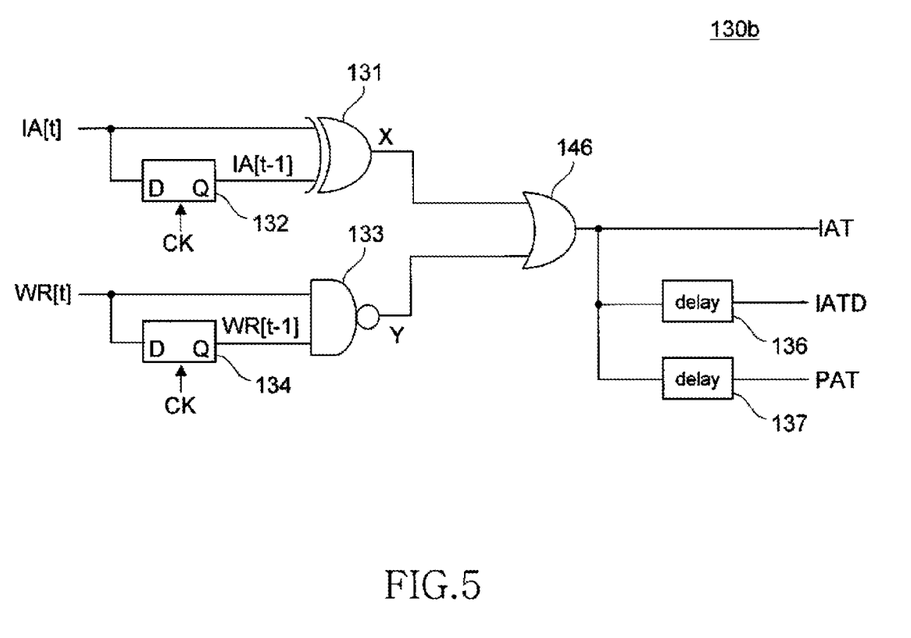
FIG. 5 is a circuit diagram of a detection circuit 130b.

FIG. 5 is a circuit diagram of the detection circuit 130b for generating the address transition detection signals IAT, IATD, and PAT.

As shown in FIG. 5, according to the detection circuit 130b, a circuit part for generating the output X is the same as the detection circuit 130a, but a circuit part generating the output Y is different from the detection circuit 130a. The detection circuit 130b includes a NAND gate 133 to which the current write-state flag WR[t] and the write-state flag WR[t−1] one cycle before the current cycle generated by a DQ latch 134 are supplied. When the write operation is required twice consecutively (write-to-write operation), the output Y is set to L.

The outputs X and Y are supplied to the OR gate 146. When the same address is inputted in the write-to-write operation, logical levels of the address transition detection signals IAT, IATD, and PAT become L.

Because the mixer 220 fetches data from the signal line RBUSP one cycle after the current cycle, the hold circuits 205 and 214 need to be one cycle holding circuits.

Figure 6:
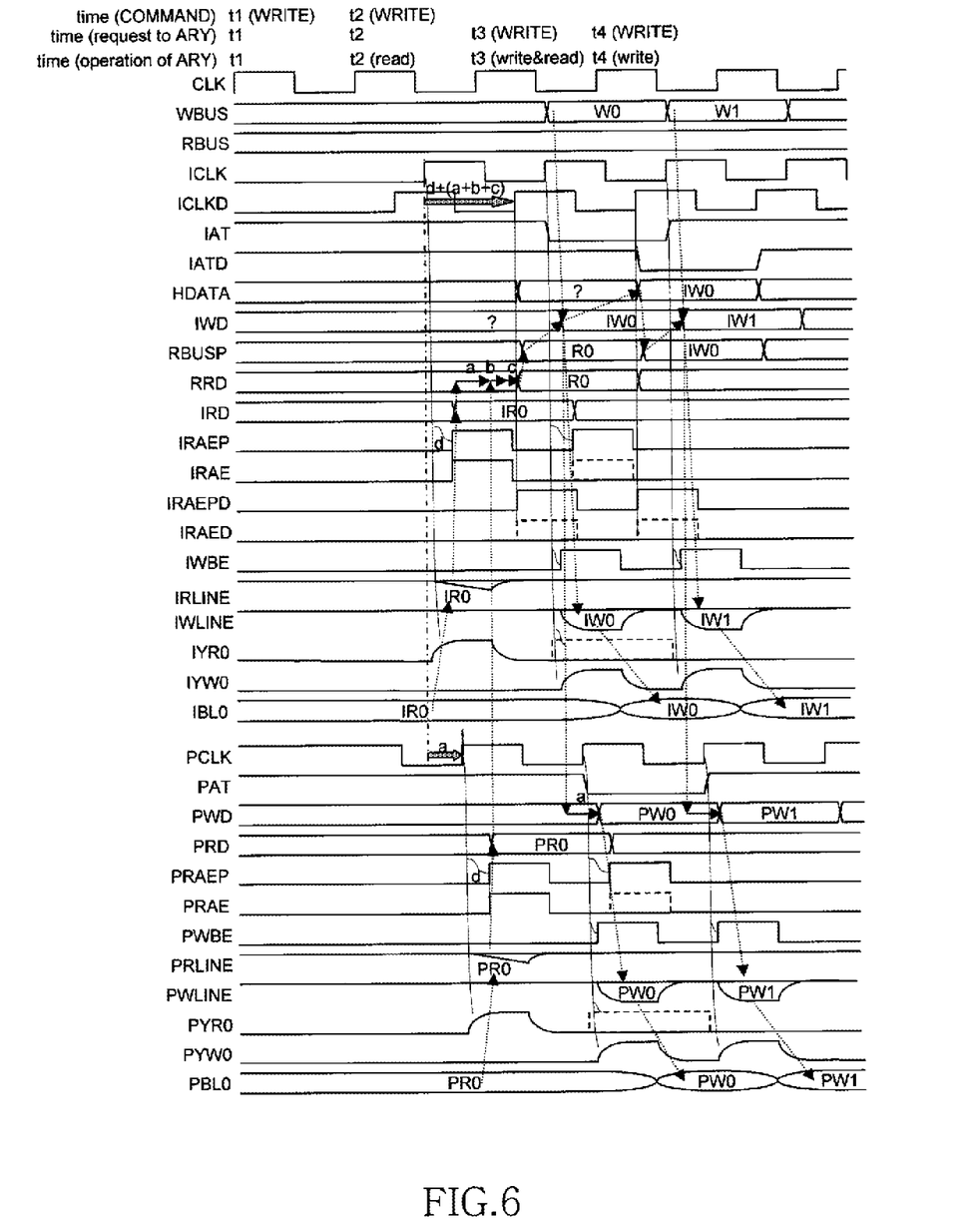
FIG. 6 is a timing diagram showing an operation timing when the address of the read cycle is the same as that of the write cycle in the write-to-write operation.

FIG. 6 is a timing diagram showing an operation timing when the addresses of the write cycles are the same in the write-to-write operation. FIG. 6 assumes a DDR1 DRAM.

First, when a write command is inputted at the time t1, the memory cell array usually receives a write cycle request at the time t3. Because the read operation can start at the time t2, it is designed so that the write cycle is started at the time t2, that is, after the read operation at the time t2, the write operation is started at the time t3. In this case, note that the detection circuit 130b shown in FIG. 5 operates by having the time t2 as the starting point.

First, the read operation is started. With respect to the information bit, the column select signal IYR0 is driven in synchronization with the internal clock ICLK and the information bit data IR0 is read from the bit line pair IBL0 to the data line IRLINE for read. The read amplifier activating timing signal IRAEP waits from the active edge of the internal clock ICLK for the amplification wait time d to rise and is held by the hold circuit 205.

Meanwhile, with respect to the check bit, the column select signal PYR0 is driven in synchronization with the internal clock PCLK obtained by delaying the internal clock ICLK by the coding time a and the check bit data PR is read from the bit line pair PBL0 to the data line PRLINE for read. The read amplifier that activates the timing signal PRAEP waits from the internal clock PCLK for the amplification wait time d to rise and is held by the hold circuit 214.

The information bit data held by the hold circuit 205 is then mixed with the check bit data held by the hold circuit 214 after the coding time a. The resultant mixed data is read to the signal line RRD as the corrected data R0 after the check time b and the correction time c. Because IATD="H", the corrected data R0 is read to the signal line RBUSP. While the output timing signal IRAEPD rises in synchronization with the internal clock ICLKD obtained by delaying the internal clock ICLK by d+(a+b+c), the signal IRAED does not rise because the current cycle is the write cycle. Accordingly, the corrected data R0 is not outputted to the read bus RBUS. On the other hand, while the data on the signal line IWD is held in the signal line HDATA by the signal IRAEPD, it is unnecessary data.

Subsequently, the write operation is started at the time t3. With respect to the information bit, the write buffer activation signal IWBE rises in synchronization with the internal clock ICLKD, write data W0 is fetched from the write bus WBUS into the mixer 220. The previously read corrected data R0 is fetched from the signal line RBUSP into the mixer 220. The write data is mixed with the corrected data in the mixer 220. The resultant information bit IW0 for write is outputted to the signal line IWD. The information bit IW0 for write is supplied to the data line IWLINE for write by the write buffer 221 and written in the bit line pair IMBL0 in synchronization with the column select signal IYW0. The information bit IW0 for write is also supplied to the coding circuit 222, so that m bits of check bit PW0 are generated. The generated check bit PW0 is supplied to the data line PWLINE for write by the write buffer 223 in synchronization with the write buffer activation signal PWBE that is in synchronization with the internal clock PCLK, and written in the bit line pair PBL0 in synchronization with the column select signal PYW0.

Normally, when the write command is inputted at the time t2, the memory cell array receives the write cycle request at the time t4, but the write cycle is started at the time t3. That is, after the read operation at the time t3, the write operation is started at the time t4. Note that the address transition detection signal IAT also operates by having the time t3 as the starting point.

First, the read operation is started. With respect to the information bit, while the column select signal IYR0 is tried to be caused to rise in synchronization with the internal clock at the time t3, it is not driven because IATD="L". Currently, the write operation in the previous write cycle is being performed in the bit line pair IBL0 but this data is not read. While the read amplifier activating timing signal IRAEP waits from the internal clock ICLK at the time t3 for the amplification wait time d to rise, the activation signal IRAE does not rise because IATD="L" and the read amplifier 204 is not activated. Accordingly, the read amplifier 204 does not flow any wasteful amplifying current.

Meanwhile, with respect to the check bit, while the column select signal PYR0 is tried to be caused to rise in synchronization with the internal clock PCLK at the time t3 obtained by delaying the internal clock ICLK by the coding time a, it is not driven because PATD="L". Currently, the write operation in the previous write cycle is being performed in the bit line pair PBL0, but this data is not read. While the read amplifier that activates the timing signal PRAEP waits from the internal clock PCLK at the time t3 for the amplification wait time d to rise, the activation signal PRAE does not rise because PATD="L" and the read amplifier 212 is not activated. Thus, the read amplifier 212 does not flow any wasteful amplifying current.

As described above, the information bit and the check bit are not read from the memory arrays 201 and 209.

The output timing signal IRAEPD then rises in synchronization with the internal clock ICLKD at the time t3. The information bit data IW0 held by the signal line IWD and used for write in the previous cycle is fetched into the register 216 and outputted to the signal line HDATA. As the address transition detection signal IATD that is in synchronization with the internal clock ICLKD is at an "L" level, the multiplexer 217 selects the input 0 and the data on the signal line HDATA is outputted to the signal line RBUSP. That is, when the successive write requests for the same address are detected by the detection circuit 130b, the information bit corrected by the correction circuit 215 is blocked and the update of the information bit held by the mixer 220 is prohibited.

Subsequently, the write operation is started at the time t4. With respect to the information bit, the write buffer activation signal IWBE rises in synchronization with the internal clock ICLKD at the time t4, the write data W1 is fetched from the write bus WBUS and supplied to the mixer 220. The signal IW0 previously determined as the read data is fetched from the signal line RBUS into the mixer 220. The mixer 220 mixes the write data with the read data. The resultant information bit IW1 for write is outputted to the signal line IWD. The outputted information bit IW0 for write is supplied to the data line IWLINE for write by the write buffer 221 and written in the bit line pair IBL0 in synchronization with the column select signal IYW0.

Meanwhile, the information bit IW1 for write is also supplied to the coding circuit 222, so that m bits of check bit PW1 are generated with a delay of the coding time a. The generated check bit PW1 is supplied to the data line PWLINE for write by the write buffer 223 in synchronization with the write buffer activation signal PWBE that is in synchronization with the internal clock PCLK at the time t4, and written in the bit line pair PBL0 in synchronization with the column select signal PYW0.

As described above, according to the second embodiment, no matter what accesses are requested, the ECC operation can be realized without rate-controlling the cycle time. Further, the spec tDPL(tWR) is not violated in the second embodiment. Note that the access time tAA is delayed by the coding time.

It is apparent that the present invention is not limited to the above embodiments, but may be modified and changed without departing from the scope and spirit of the invention.

For example, the above embodiments have explained a case that a DRAM is an application target of the present invention. However, the application target of the present invention is not limited to DRAMs, and the invention is also applicable to other semiconductor memory devices such as a PRAM.

Figure 7A:
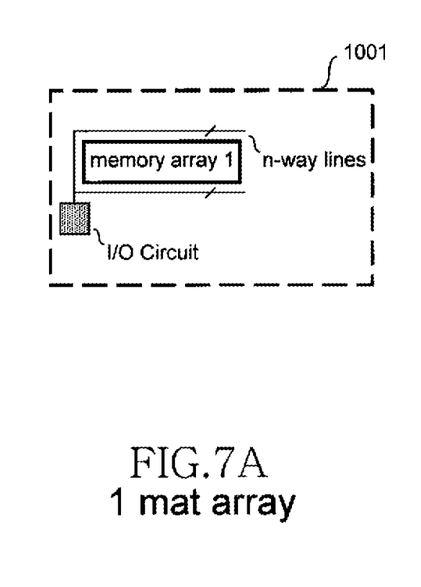
FIG. 7A shows one mat array configuration.
Figure 7B:
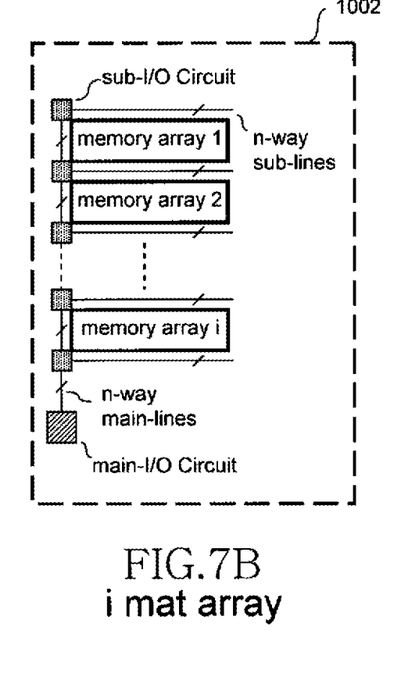
FIG. 7B shows plural mat arrays configuration having a hierarchical data line configuration.
Figure 7C:
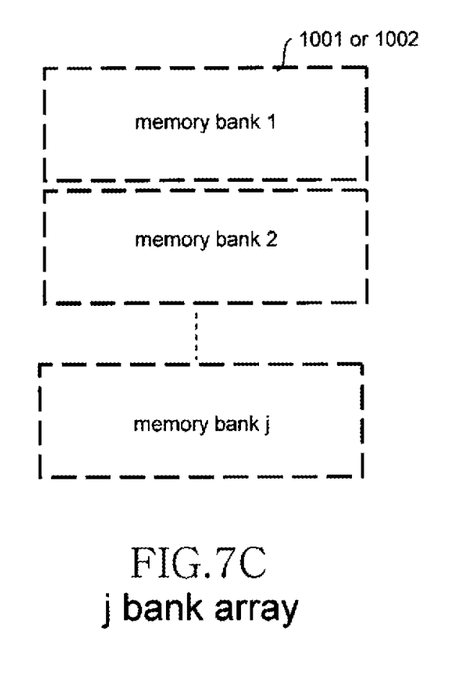
FIG. 7C shows a configuration divided into plural banks.

Moreover, data lines that connect the input/output circuit to the memory array in the above embodiments can be ones with a hierarchical configuration. Any number of hierarchies can be used in the configuration. The present invention can be applied to a one mat array configuration 1001 shown in FIG. 7A as described above. Even in a case of a multiple mat array configuration 1002 with a hierarchical data line configuration used for arrays of normal memory devices as shown in FIG. 7B, a sub input/output circuit is connected via a sub data line to a memory array and a main input/output circuit is connected via a main data line, the sub input/output circuit, and the sub data line to the memory array. Accordingly, the present invention can be applied in both cases of the sub input/output circuit and the main input/output circuit. Needless to mention, as shown in FIG. 7C, banks that can be operated independently can be provided.

Furthermore, while the memory array for information bit that stores information bits and the memory array for check bit that stores check bits are provided separately in the above embodiments, it is not essential to separate these arrays. The information bit and the check bit can be stored in the same memory cell array.

What is claimed is:

1. A method comprising:
reading first data from a memory array in response to a write request, the write request including second data that is to be written into the memory array and a mask information that designates a part of the second data to be masked;
performing an error correction on the first data to produce a third data;
overwriting a portion of the third data with a remaining part of the second data to produce fourth data;
writing the fourth data into the memory array;
coding the fourth data to produce fifth data; and
writing the fifth data into the memory array.

2. The method as claimed in claim 1, further comprising reading sixth data from the memory array in response to the write request, and wherein the error correction is performed in response to the sixth data.

3. The method as claimed in claim 2, wherein the error correction includes producing a syndrome in response to the sixth data and performing logic operation on the first data and the syndrome.

4. The method as claimed in claim 2, wherein the sixth data is overwritten with the fifth data.

5. The method as claimed in claim 1, further comprising holding the fourth data at register.

6. The method as claimed in claim 5, further comprising outputting the fourth data in response to a read request following the write request.

7. The method as claimed in claim 1, wherein the number of bits of the fifth data is less than half of the number of bits of the fourth data.

8. The method as claimed in claim 1, wherein the write request further includes a row address and a column address and the first data is designated by the row address and the column address.

9. The method as claimed in claim 8, further comprising reading sixth data from the memory array in response to the write request, and wherein the error correction is performed in response to the sixth data.

10. The method as claimed in claim 9, wherein the error correction includes producing a syndrome in response to the sixth data and performing logic operation on the first data and the syndrome.

11. The method as claimed in claim 9, wherein the sixth data is overwritten with the fifth data.

12. The method as claimed in claim 8, further comprising holding the fourth data at register.

13. The method as claimed in claim 12, further comprising outputting the fourth data in response to a read request following the write request.

14. The method as claimed in claim 8, wherein the number of bits of the fifth data is less than half of the number of bits of the fourth.

* * * * *